US012013284B2

(12) United States Patent
Lin et al.

(10) Patent No.: US 12,013,284 B2
(45) Date of Patent: Jun. 18, 2024

(54) OPTICAL SENSOR MODULE AND PACKAGING METHOD THEREOF

(71) Applicant: SENSORTEK TECHNOLOGY CORP., Hsinchu County (TW)

(72) Inventors: Yu-Min Lin, Hsinchu County (TW); Feng-Jung Hsu, Hsinchu County (TW)

(73) Assignee: Sensortek Technology Corp., Zhubei (TW)

( * ) Notice: Subject to any disclaimer, the term of this patent is extended or adjusted under 35 U.S.C. 154(b) by 0 days.

(21) Appl. No.: 18/067,066

(22) Filed: Dec. 16, 2022

(65) Prior Publication Data
US 2023/0228619 A1 Jul. 20, 2023

Related U.S. Application Data

(60) Provisional application No. 63/265,504, filed on Dec. 16, 2021.

(51) Int. Cl.
*G01J 1/02* (2006.01)
*G01J 1/04* (2006.01)

(52) U.S. Cl.
CPC ........... *G01J 1/0271* (2013.01); *G01J 1/0459* (2013.01); *G01J 2001/0276* (2013.01); *G01J 1/0474* (2013.01)

(58) Field of Classification Search
CPC ...... G01J 1/0271; G01J 1/0459; G01J 1/0474; G01J 2001/0276
See application file for complete search history.

(56) References Cited

U.S. PATENT DOCUMENTS

| | | | | |
|---|---|---|---|---|
| 2006/0072882 | A1* | 4/2006 | Casati | G02B 6/4277 385/94 |
| 2011/0032409 | A1* | 2/2011 | Rossi | H01L 27/14632 348/340 |
| 2016/0216777 | A1* | 7/2016 | Geiger | G06F 3/0312 |
| 2019/0081196 | A1 | 3/2019 | Ho et al. | |
| 2023/0115210 | A1* | 4/2023 | Cheah | G01N 21/62 435/288.7 |

FOREIGN PATENT DOCUMENTS

TW 440914 B 6/2001
TW 536833 B 6/2003

OTHER PUBLICATIONS

Office Action mailed to Taiwanese Corresponding Patent Application No. 111148620 on Sep. 18, 2023.
Search Report mailed to Taiwanese Corresponding Patent Application No. 111148620 on Sep. 18, 2023.

* cited by examiner

*Primary Examiner* — Thanh Luu
(74) *Attorney, Agent, or Firm* — Rosenberg, Klein & Lee

(57) ABSTRACT

An optical sensor module and a packaging method thereof are disclosed, wherein the optical sensor module comprises a substrate having a light sensing element; and a housing made of a transparent material. The housing is connected to the substrate and covers the light sensing element. The housing has a light-receiving area facing the light sensing element, and the inner surface of the housing toward the substrate is provided with a light-shielding coating in a portion outside of the light-receiving area. In this way, optical components such as the light sensor can be effectively protected, and still retain the effect of avoiding noise light interference with the light sensor module.

19 Claims, 12 Drawing Sheets

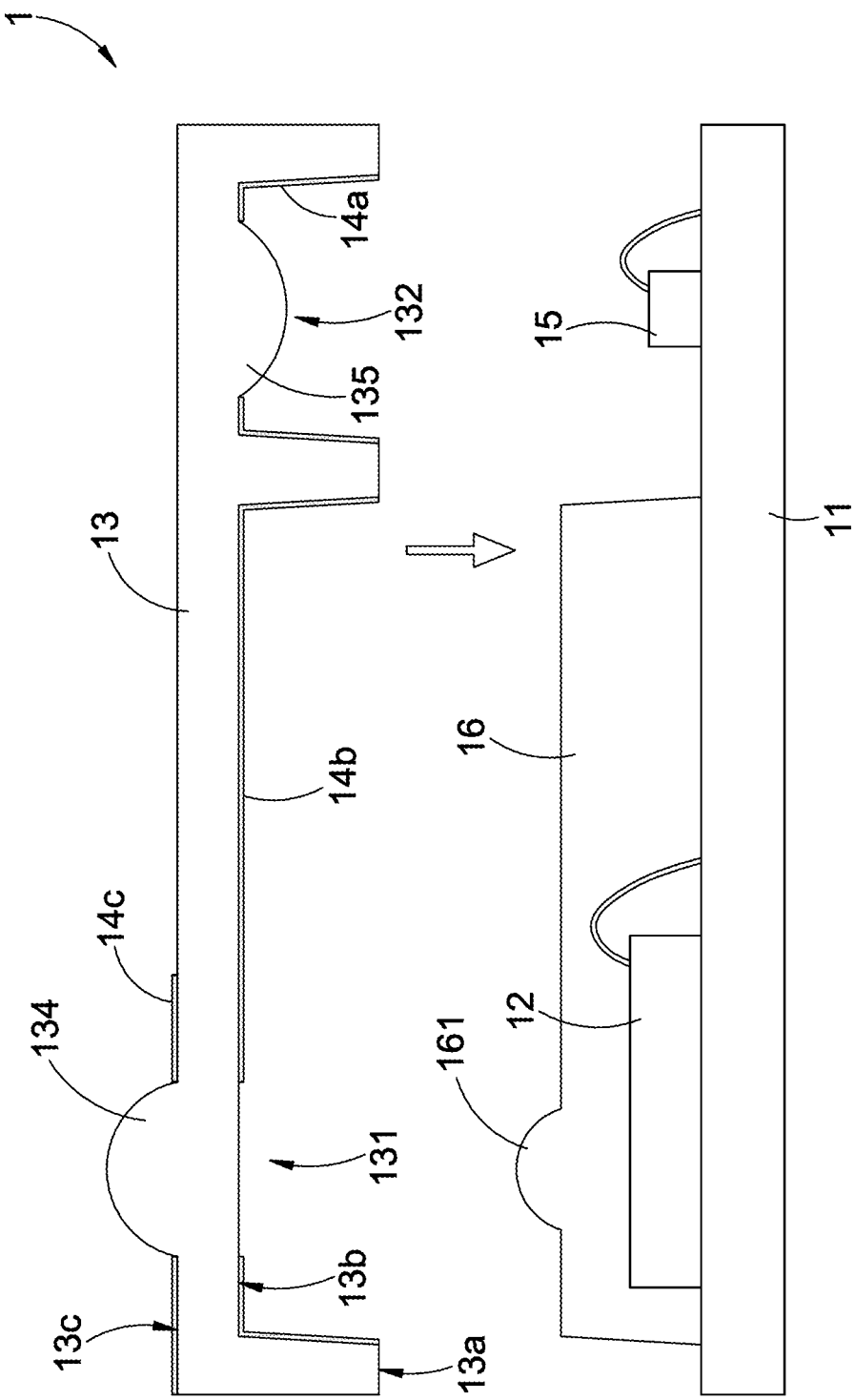

OPTICAL SENSOR MODULE AND PACKAGING METHOD THEREOF

FIELD OF THE INVENTION

The present application generally relates to an optical sensor module, and particularly to an optical sensor module having a light-sensing device and the packaging method thereof.

BACKGROUND OF THE INVENTION

Optical sensing devices, for example, CMOS image sensors (CIS), proximity sensors (PS), and ambient light sensors, are applied extensively in mobile devices such as cellular phones or other consumer electronic devices. These optical sensing devices require light-sensing devices. In particular, proximity sensors further require light-emitting devices.

FIG. 1 shows an optical sensor 9 according to the prior art, in which a light-sensing device 92 and a light-emitting device 93 are disposed on a substrate 91. In general, the light-sensing device 92 is integrated in the IC chip. To protect optical elements such as the chip of the light-sensing device 92 and the emitter of the light-emitting device 93, according to the prior art, the light-sensing device 92 and the light-emitting device 93 will be sealed in a transparent plastic material 94. For example, a liquid transparent glue material (such as resin) can be injected into a mold. After solidification, the mold is removed. Then the light-sensing device 92 and the light-emitting device 93 are covered in the transparent plastic material 94.

To avoid interference on the light-sensing device 92 by the noise light or the light emitted from the light-emitting device 93, the packaging method according to the prior art adopts an opaque metal or plastic lid as the covering device. The packaging method for the light sensor 9 is in batch. In other words, on the whole circuit board with multiple substrates 91, the transparent plastic material 94 is first cut for forming grooves 941 surrounding or even passing the substrate 91. Next, opaque lids 95 are bonded to the substrates 91 for covering and jointing with the transparent plastic material 94. This assembly method is complicated. The cutting process might even damage the structure. Consequently, the groove area must be free from any wire or circuit structure. This method will occupy the wire bonding space and hence disadvantageous to package miniaturization.

In addition, as the devices shrink, the requirements for the performance of optical sensor 9 is increased. Thereby, optical structures on the optical paths of the light-sensing device 92 and the light-emitting device 93 are required to adjust their optical properties. For example, since the opaque lid 95 cannot be used to manufacture lenses, lenses 942 are manufactured on the transparent plastic material 94 according to the prior art. Since the transparent plastic material 94 needs to envelop the light-sensing device 92 and the light-emitting device 93, additional assembly and cuts are unavoidable, leading to limitations on lens design and increased difficulty in fabrication. Furthermore, although the optical structures such as lenses can be manufactured as independent modules (for example, use a transparent material to manufacture additional tube lenses as the optical structures) and bonded to the opaque lid 95, this method undoubtedly increases component number and assembly steps.

In the trend of device miniaturization, the lids, grooves, or other optical structures require high precision for assembly and forming optical sensor units with excellent performance. Accordingly, the process complexity is increased significantly and the production yield can be decreased. It is urged to improve the situation.

SUMMARY OF THE INVENTION

An objective of the present application is to provide an optical sensor module and the packaging method thereof. By using a transparent material for manufacturing the housing and including a shading coating layer on the housing, the light-sensing device or the light-emitting device can be protected effectively, as well as avoiding interference on the light sensor module by noise light. Thereby, the packaging process can be simplified; the production yield can be increased; the packaging design can be miniaturized; the design flexibility can be improved; and the manufacturing difficulty of optical structures can be reduced.

According to an embodiment of the present application, an optical sensor module is disclosed. The optical sensor module comprises a substrate and a housing made of a transparent material. The substrate includes a light-sensing device. The housing is connected to the substrate and covers the light-sensing device. The housing includes a light-receiving region facing the light-sensing device. The housing includes a shading coating layer on the inner surface facing the substrate and outside the light-receiving region.

According to an embodiment of the present application, a packaging method for an optical sensor module is disclosed. The method comprises: disposing optical elements including a light-sensing device on a substrate; disposing a shading coating layer on the surface of a housing made of a transparent material; and connecting and fixing the housing on the substrate.

BRIEF DESCRIPTION OF DRAWINGS

FIG. 9 shows a cross-sectional view of the optical sensor module according to the third embodiment of the present application.

DETAILED DESCRIPTION OF THE INVENTION

In order to make the structure and characteristics as well as the effectiveness of the present application to be further understood and recognized, a detailed description of the present application is provided as follows along with embodiments and accompanying figures.

Figure 1:
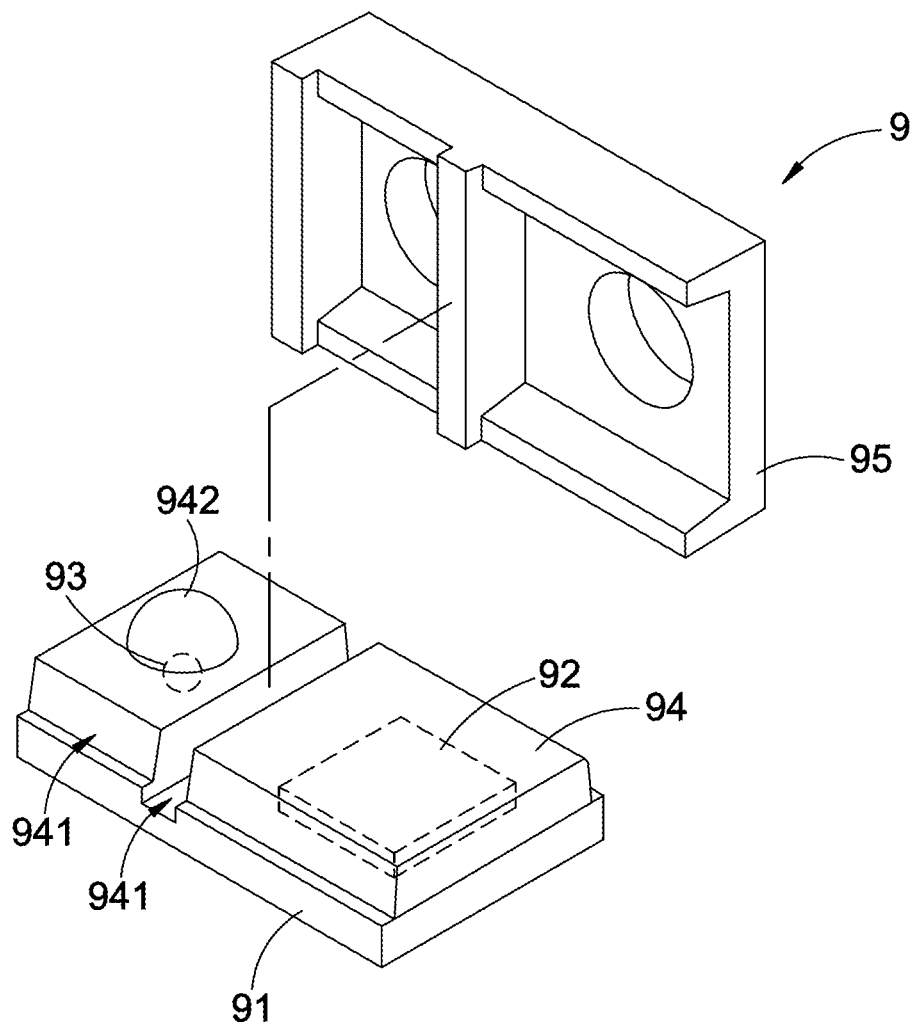
FIG. 1 shows a structural schematic diagram of the optical sensor according to the prior art.
Figure 2:
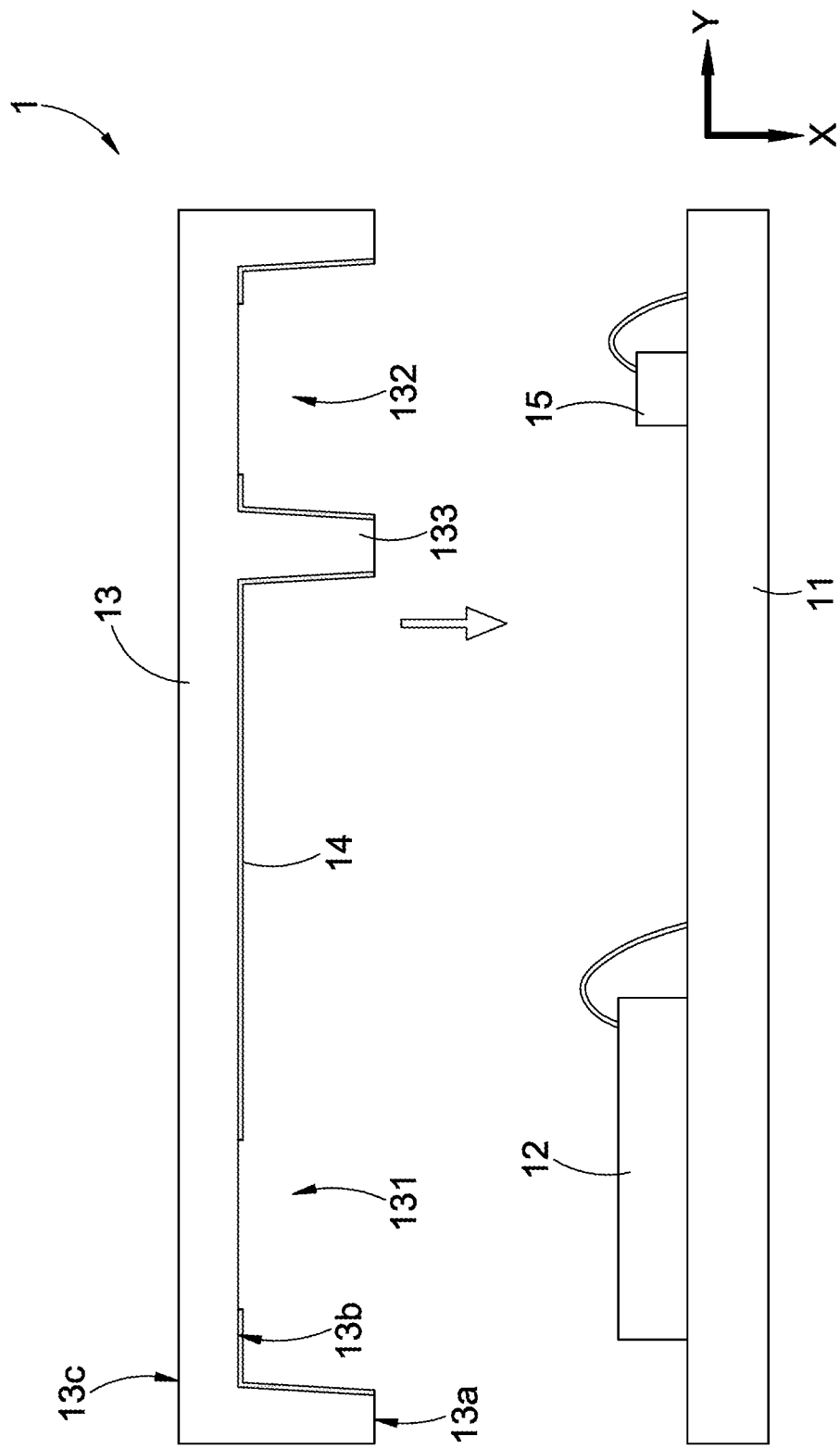
FIG. 2 shows a cross-sectional view of the optical sensor module according to the first embodiment of the present application.
Figure 3:
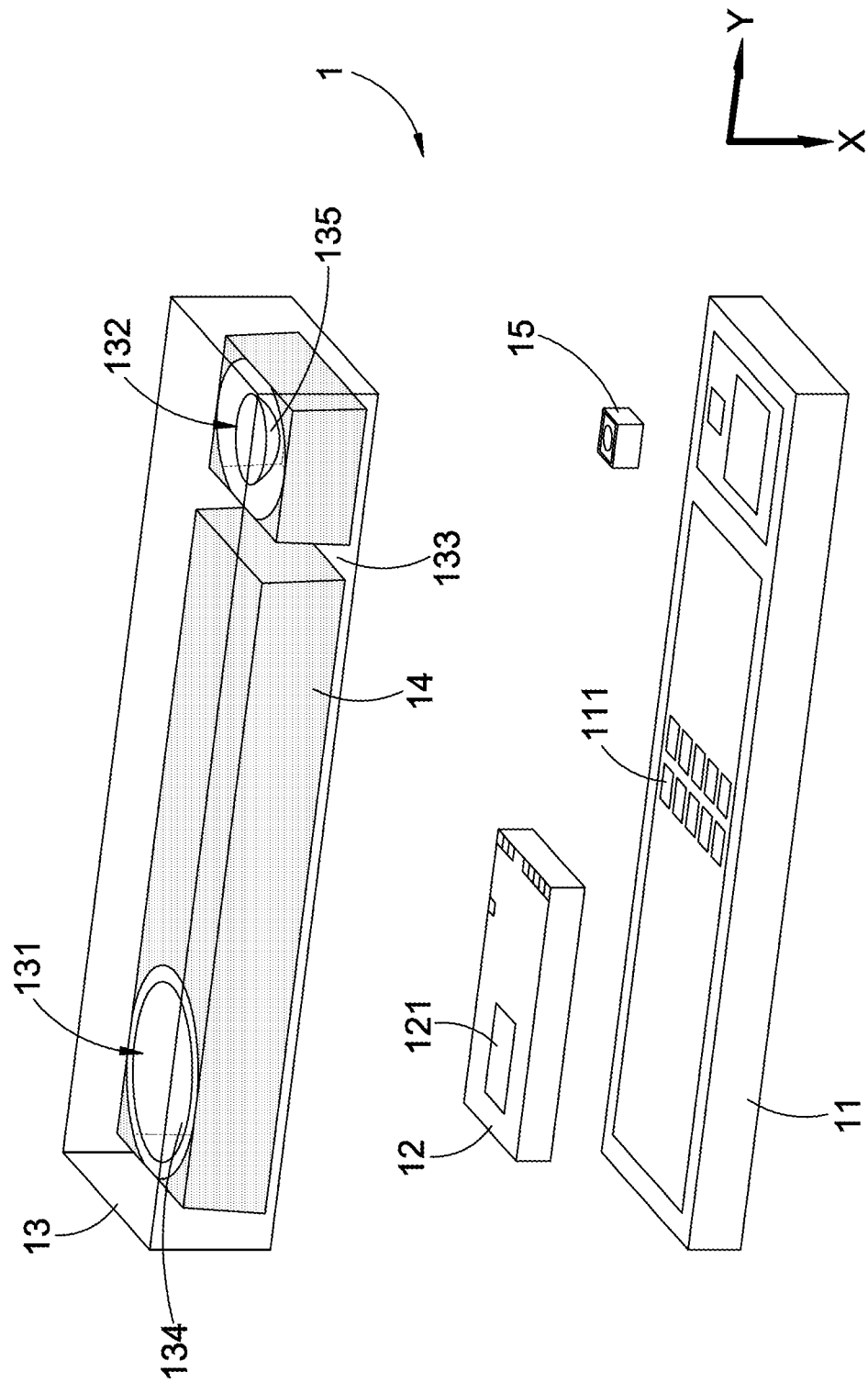
FIG. 3 shows a stereoscopic-structure schematic diagram of the optical sensor module according to the first embodiment of the present application.

First, please refer to FIG. 2 and FIG. 3. FIG. 2 shows a cross-sectional view of the optical sensor module according to the first embodiment of the present application; FIG. 3 shows a stereoscopic view of the first embodiment. The optical sensor module 1 according to the first embodiment comprises a substrate 11, a light-sensing device 12, and a housing 13. The substrate 11 can be any material suitable for optical packaging, for example, a copper substrate, a ceramic substrate, a lead frame, a resin substrate, or a printed circuit board. The light-sensing device 12 can be formed by an IC chip. In addition, the light-sensing device 12 is disposed on the substrate 11. In general, the light-sensing device 12 can be fixed to the blank substrate 11 by die attaching. Depending on the type of the optical sensor module 1, the light-sensing device 12 can include one or multiple light-sensing units 121. When the light-sensing device 12 includes multiple light-sensing units 121, a light-sensing matrix can be formed. Nonetheless, the present application is not limited to the embodiment. The housing 13 is made of a transparent material, which allows the light with specific wavelengths or any wavelength to pass through. The housing 13 includes one or multiple contact surface 13a that allows the housing 13 to connect to the substrate 11 along a vertical direction X. The housing 13 can be connected and fixed to the substrate 11 by gluing or high-temperature welding. The housing 13 will cover the light-sensing device 12 after connecting to the substrate 11.

The housing 13 includes a light-receiving region 131 facing the light-sensing device 12 along the vertical direction X. The housing 13 also includes a shading coating layer 14 on the inner surface 13b facing the substrate 11 and outside the light-receiving region 131. The shading coating layer 14 can be formed by spraying or coating using a shading material, which can be ink, photoresist, or black epoxy. Besides, the transmittance of the shading material for specific or all wavelengths is preferably less than 20%. Since the shading coating layer 14 will not cover the light-receiving region 131 of the housing 13, the light-receiving path of the light-sensing device 12 will not be shaded.

Figure 4A:
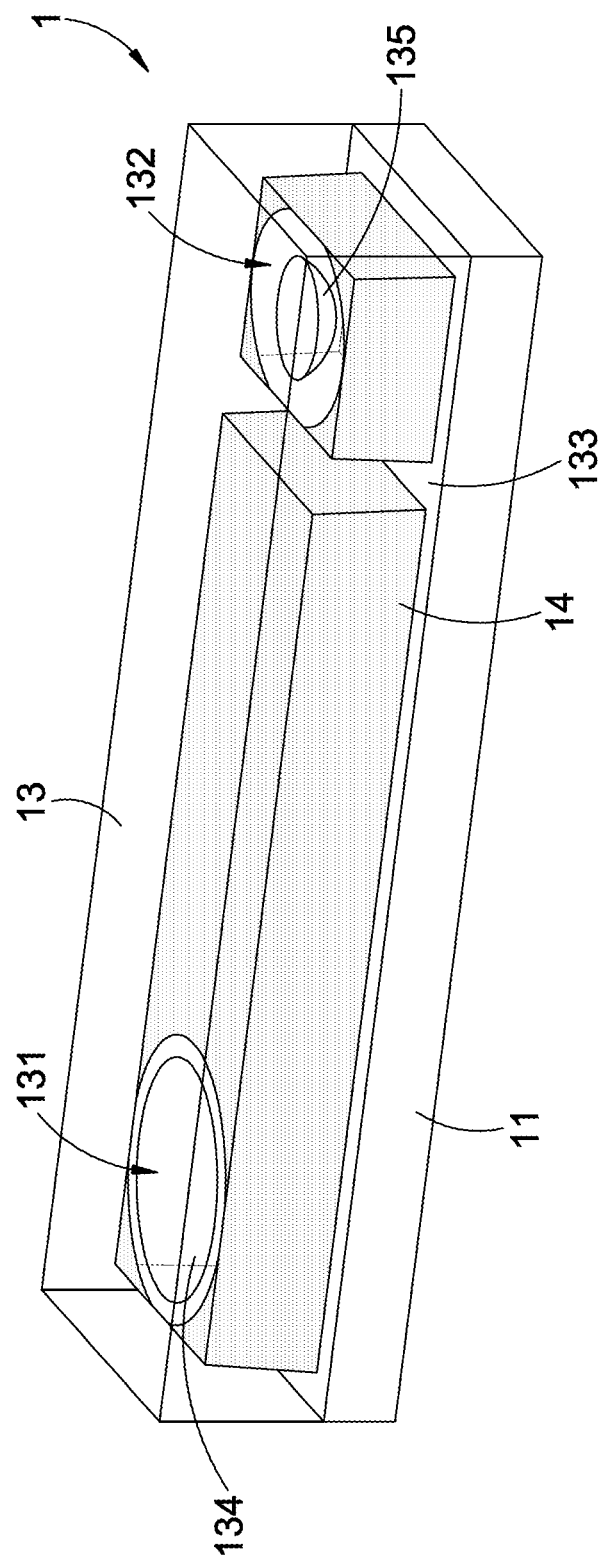
FIG. 4A shows a perspective view of the optical sensor module after assembly according to the first embodiment of the present application.
Figure 4B:
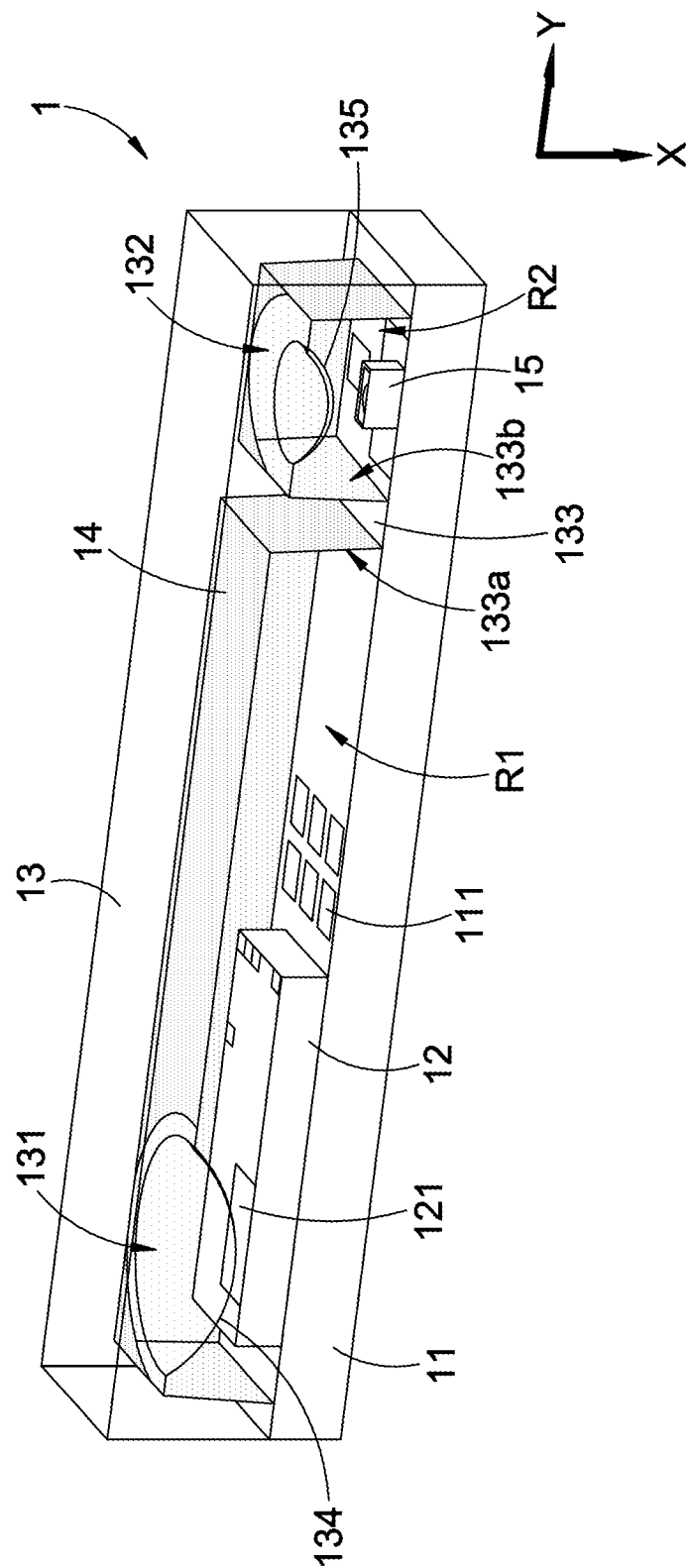
FIG. 4B shows a cross-sectional view of the optical sensor module after assembly according to the first embodiment of the present application.

Please refer to FIG. 4A and FIG. 4B. FIG. 4A shows a perspective view of the optical sensor module after assembly according to the first embodiment of the present application; FIG. 4B shows a cross-sectional view of the first embodiment after assembly. After the housing 13 is connected to the substrate 11, an compartment R1 will be formed between the substrate 11 and the inner surface 13b of the housing 13. The light-sensing device 12 is just located in the compartment R1. The housing 13 is made of a transparent material. Thereby, it is not necessary to drill a hole for light passage. That is to say, the compartment R1 can be hermetic. Consequently, although no transparent plastic material is used to seal the light-sensing device 12 according to the present embodiment, the light-sensing device 12 can still be protected by the housing 13 by blocking external moist, dust, or dirt, which might damage the light-sensing device 12 once contacting. In fact, not only the light-sensing device 12 is protected by the housing 13, the pads 111 for connecting electrically to the light-sensing device 12 on the substrate 11 and the wiring between the substrate 11 and the light-sensing device 12 can both be protected by the housing 13 as well.

In the optical sensor module 1 according to the first embodiment of the present application, no transparent plastic material 94 is required to cover the light-sensing device 92 like in the prior art. Consequently, no cutting step for the transparent plastic material 94 is required. According to the first embodiment, the housing 13 is made of a transparent material. It is not necessary to drill a hole for light passage. Thereby, once the housing 13 is connected on the substrate 11, the excellent protection is formed. Moreover, by including the shading coating layer 14 on the inner surface 13b of the housing 13, the interference of noise light on the light-sensing device 12 can be avoided.

Figure 5:
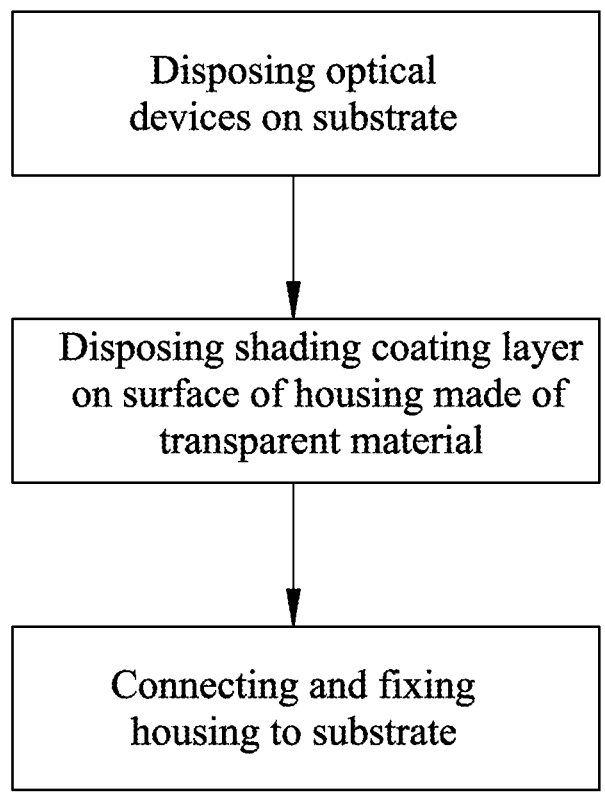
FIG. 5 shows a flowchart of the packaging method for the optical sensor module according to the first embodiment of the present application.

Please refer to FIG. 5, which shows a flowchart of the packaging method for the optical sensor module according to the first embodiment of the present application. The packaging method comprises:

Disposing the optical element on the substrate 11, in which the optical element includes the light-sensing device 12 according to the first embodiment;

Disposing the shading coating layer 14 on the surface of the housing 13 made of a transparent material; and Connecting and fixing the housing on the substrate 11.

Thereby, according to the packaging method for the optical sensor module according to the first embodiment of the present application, only the shading coating layer 14 is required on the inner surface 13b of the housing 13 before connecting the housing 13 to the substrate 11. The complicated process of cutting the transparent plastic material 94 according to the prior art can be omitted completely. In addition, the effective area for disposing circuit structures is further extended, which is beneficial to the miniaturization of packaging design.

In the following, various embodiments of the optical sensor module according to the present application will be described in detail.

Please refer again to FIG. 2, FIG. 3, and FIG. 4B. According to the first embodiment, if the optical sensor module 1 is used as a proximity sensor, a depth sensor, or a specific image sensor (such of a time-of-flight distance sensor), in addition to the light-sensing device 12, the optical element used by the optical sensor module 1 generally further needs a light-emitting device 15, which can be a light-emitting diode or a laser emitter with wavelengths in the infrared band (such 940 nm) or the visible-light band (such as 550 nm). The light-emitting device 15 is also disposed on the substrate 11. It can be fixed on the blank substrate 11 along with the light-sensing device 12 using the attaching method as described above. After the housing 13 is connected to the substrate 11, it covers the light-sensing device 12 and the light-emitting device 15. The housing 13 includes a light-emitting region 132 facing the light-emitting device 15 along the vertical direction X. The housing 13 also includes a shading coating layer 14 on the inner surface 13b facing the substrate 11 and outside the light-emitting region 132. Since the shading coating layer 14 will not cover the light-emitting region 132 of the housing 13, the light-emitting path of the light-emitting device 15 will not be shaded. Preferably, the transmittance of the shading material for the wavelengths of the light emitting by the light-emitting device 15 is preferably less than 20%.

Specifically, the light-sensing device 12 and the light-emitting device 15 are spaced on the substrate 11 along a horizontal direction Y. The housing 13 covers the light-sensing device 12 and the light-emitting device 15 from above the substrate 11 along the vertical direction X. The vertical direction X is perpendicular to the horizontal direction Y. According to the present embodiment, the housing 13 includes a rib part 133 protruding toward the substrate 11 along the vertical direction X. The rib part 133 is located between the light-sensing device 12 and the light-emitting device 15 along the horizontal direction Y. The compartment formed between the substrate 11 and the inner surface 13b of the housing 13 is divided into a first compartment R1 and a second compartment R2 by the rib part 133. The light-sensing device 12 is located in the first compartment R1; the light-emitting device 15 is located in the second compartment R2. The housing 13 is made of a transparent material. It is not necessary to drill a hole for light passage. In other words, the first compartment R1 and the second compartment R2 are hermetic. Consequently, although no transparent plastic material is used to seal the light-sensing device 12 according to the present embodiment, the light-sensing device 12, the light-emitting device 15, and other structures on the substrate 11 can still be protected by the housing 13 by blocking external moist, dust, or dirt from contacting. It is noteworthy that according to some embodiments of the present application, if the housing 13 does not include the rib part 13, the light-sensing device 12, the light-emitting device 15, and other structures on the substrate 11 share the same compartment with the protection by the housing 13.

It is noteworthy that, as shown in FIG. 4B, according to the present embodiment, a surface 133a of the rib part 133 facing the first compartment R1 includes the shading coating layer 14. Alternatively, the surface 133b of the rib part 133 facing the second compartment R2 includes the shading coating layer 14. Thereby, the shading coating layer 14 on the rib part 133 can block the light emitted from the light-emitting device 15 to prevent crosstalk signals formed by the light emitted from the light-emitting device 15 to the light-sensing unit 121 of the light-sensing device 12 directly or indirectly.

More importantly, the housing 13 according to the present embodiment can include an optical structure, which generally can be a lens structure, a filter structure (such as a polarizer or a color filter), a diffusing structure, or an optical microstructure. In FIGS. 3, 4A, and 4B, it is shown that the housing 13 can include a light-sensing lens 134 and a light-emitting lend 135. The light-sensing lens 134 is disposed in the light-receiving region 131 of the housing 13; the light-emitting lens 135 is disposed in the light-emitting region 132 of the housing 13. Since the housing 13 according to the present of the present application is made of a transparent material, the light-sensing lens 134 and the light-emitting lens 135 can be fabricated integrally with the housing 13. Namely, these lens structures can be formed while molding and manufacturing the housing 13. In practice, the light-sensing lens 134 and the light-emitting lens 135 can be formed by another molding process. Anyhow, compared to manufacturing lenses using the transparent plastic material 94 according to the prior art and facing limited lens design flexibility and fabrication difficulty, the housing 13 according to the present embodiment of the present application is fixed to the substrate 11 after the housing 13 is completed. Consequently, the design freedom and fabrication difficulty for the light-sensing lens 134 and the light-emitting lens 135 are apparently superior to the prior art.

Figure 6:
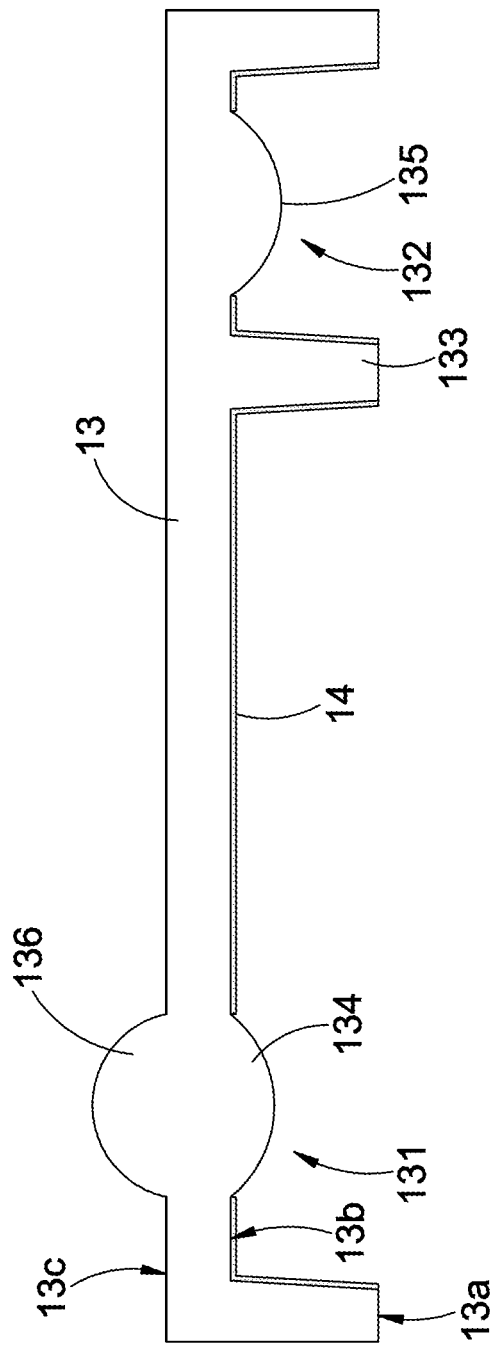
FIG. 6 shows a cross-sectional view of the optical sensor module according to the second embodiment of the present application.
Figure 7:
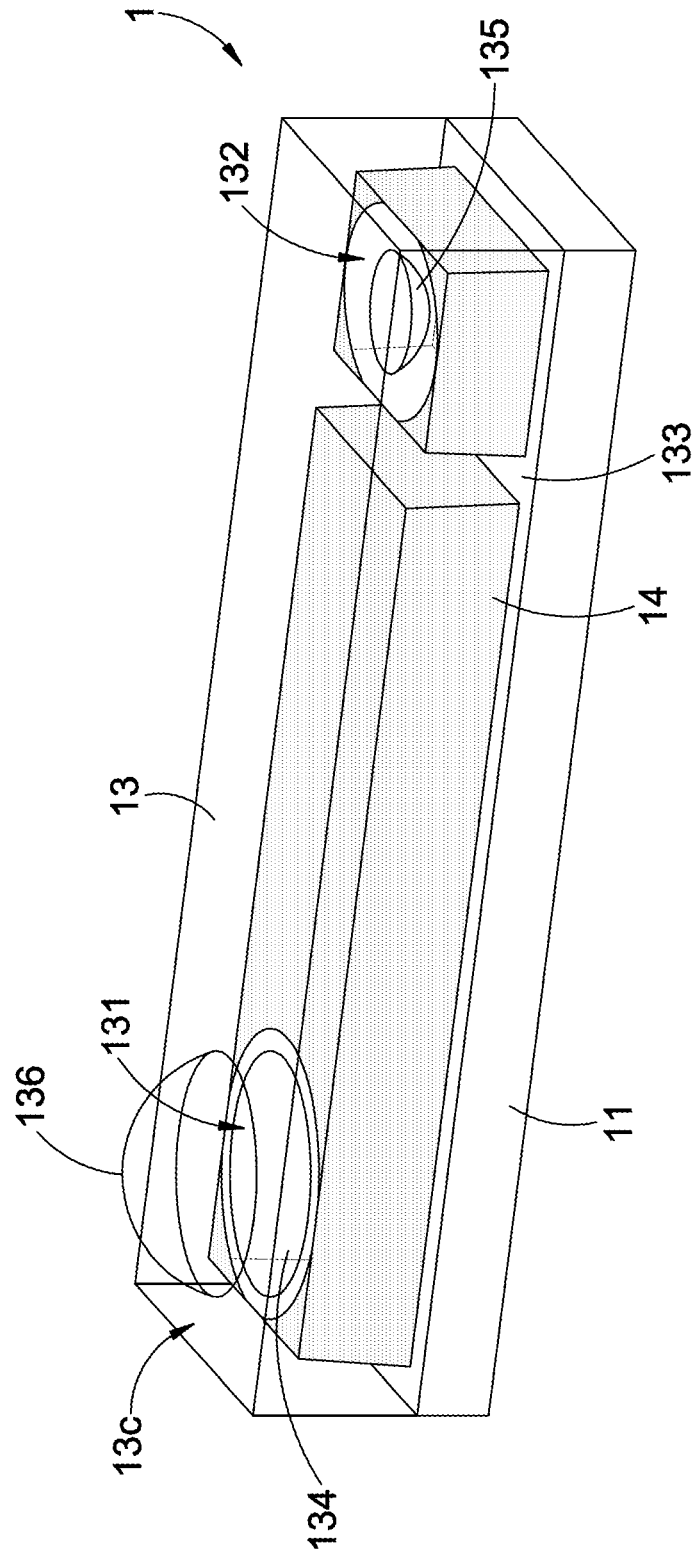
FIG. 7 shows a perspective view of the optical sensor module according to the second embodiment of the present application.

Please refer to FIG. 6 and FIG. 7. FIG. 6 shows a cross-sectional view of the optical sensor module according to the second embodiment of the present application; FIG. 7 shows a perspective view of the optical sensor module according to the second embodiment of the present application. The present embodiment is used to illustrate that, in addition to the inner surface 13b of the housing 13 facing the substrate 11, the optical structures including the light-sensing lens 134 and the light-emitting lens 135 as described above can alternatively be disposed on the outer surface 13c of the housing 13 opposite to the substrate 11. For example, another light-sensing lens 136 is disposed on the outer surface 13c of the substrate 11. Besides, according to the second embodiment, it is shown that no matter the light-receiving region 131 or the light-emitting region 132, the housing 13 can include a plurality of optical structures, which is quite different from the prior art. This is because, according to the prior art, to manufacture the lens 942 using the transparent plastic material 94 with the transparent plastic material 94 enveloping the light-sensing device 92 and the light-emitting device 93, only the surface opposite to the substrate 91 can be used to dispose the optical structures. In contrast, according to the embodiments of the present application, the compartment formed between the substrate 11 and the inner surface 13b of the housing 13 is used to accommodate and protect the light-sensing device 12 and the light-emitting device 15. Thereby, the design freedom for the optical structures is improved substantially.

Figure 8A:
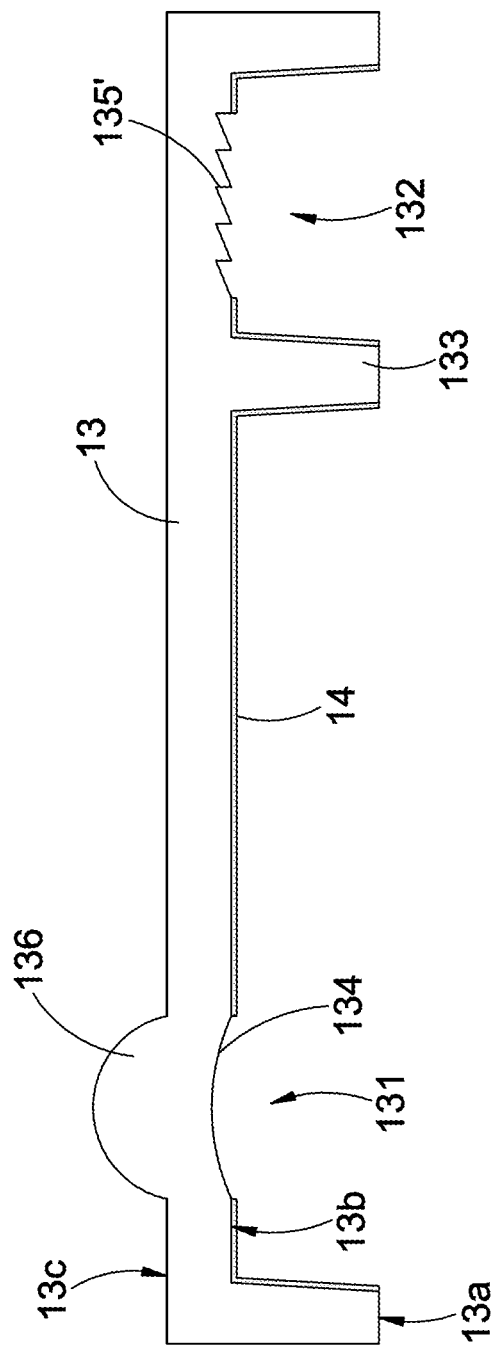
FIG. 8A shows a schematic diagram of the variation of manufacturing optical structures on the housing of the optical sensor module of the present application.
Figure 8B:
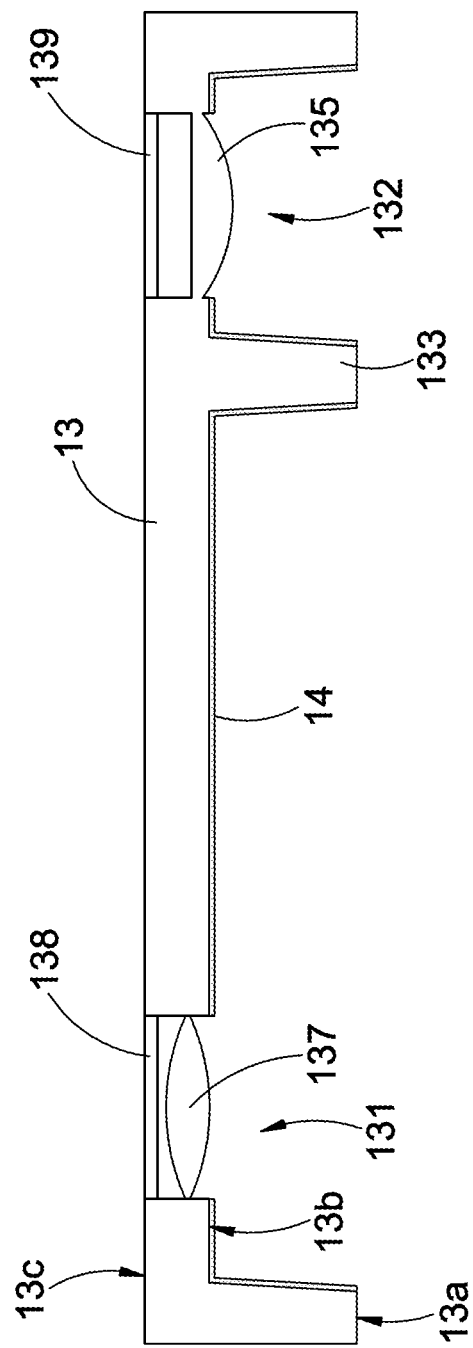
FIG. 8B shows a schematic diagram of the variation of assembling and integrating the optical structures on the housing of the optical sensor module of the present application.

Although convex lenses are adopted to illustrate the optical structures of the housing 13 according to the embodiments described above, the optical structures can be different structures depending on practical applications. For example, as shown in FIG. 8A, the light-sensing lens 134 can be a concave lens. Alternatively, the light-emitting lens 135 can even be replaced by an optical microstructure 135'. Furthermore, as shown in FIG. 8B, since the housing 13 according to the embodiments of the present application is made of a transparent material, even the optical structures are not fabricated on the housing 13 directly, they can be assembled to the housing 13. For example, the housing 13 can include a hole in the light-receiving region 131. This hole can then be used for assembling the optical structures such as a lens structure 137 or a filtering structure 138. Nonetheless, one or more of the lens structure 137 and the filtering structure 138 should preferably seal the hole for maintaining hermeticity of the compartment between the housing 13 and the substrate 11. Alternatively, a blind via can be formed in the housing 13 before or after disposing the light-emitting lens 135 in the light-emitting region 132. The blind via, likewise, can be used to assemble the optical structures such as a diffusing structure 139. In contrast, the openings on the opaque lid 95 for receiving and emitting light according to the prior art are not suitable for combining with the optical structures, because the opaque property of the lid 95 might affect the characteristics of the optical structures. As described above, to solve this problem, the optical structures should be manufactured as independent modules (for example, use a transparent material to manufacture additional tube lenses as the optical structures) according to the prior art before bonding to the opaque lid 95. In contrast, these additional components and processes are omitted in the embodiments according to the present application.

Figure 10:
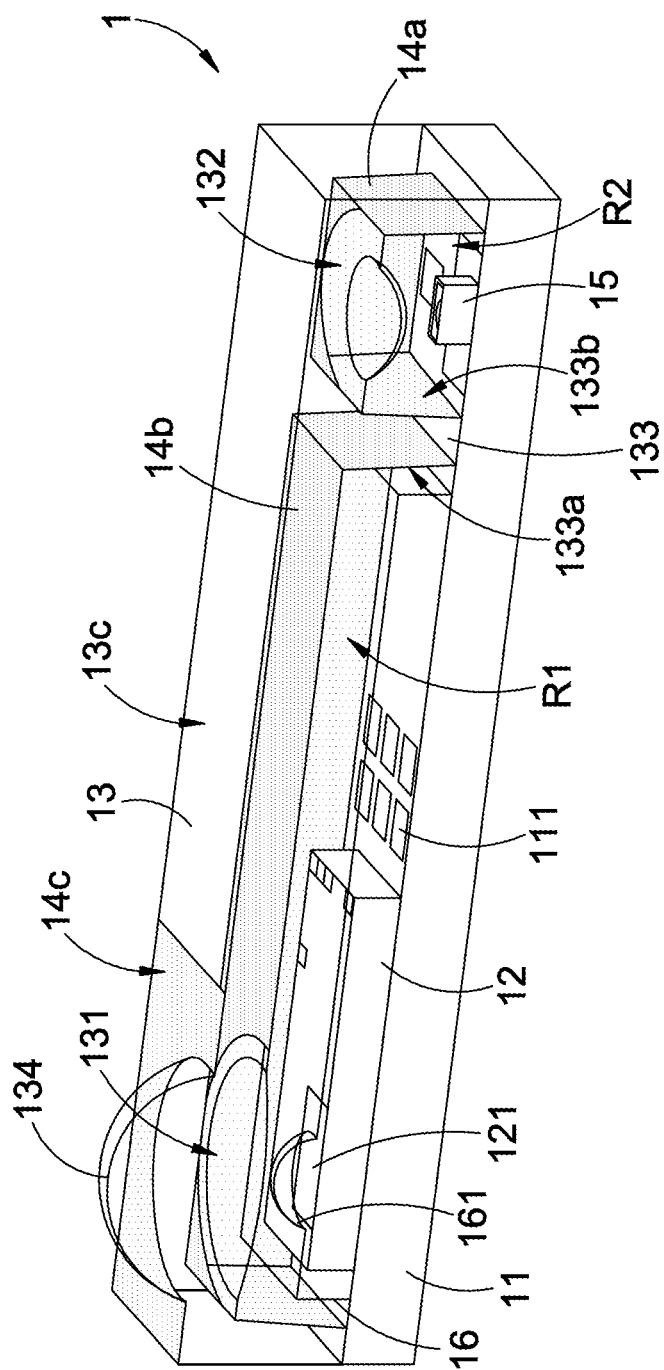
FIG. 10 shows a cross-sectional view of the optical sensor module after assembly according to the third embodiment of the present application.

Please refer to FIG. 9 and FIG. 10. FIG. 9 shows a cross-sectional view of the optical sensor module according to the third embodiment of the present application; FIG. 10 shows a cutaway view of the optical sensor module after assembly according to the third embodiment of the present application. The difference between the present embodiment and the previous ones is that, in the shading coating layer 14 according to the present embodiment, the material of a first shading coating layer 14a facing the light-emitting device 15 is used to shade the light emitted from the light-emitting device 15. Thereby, the material with smaller transmittance for the wavelength of the light emitted by the light-emitting device 15 can be selected. Contrarily, since the external noise light with various wavelengths can be reflected by the housing 13 to the light-sensing device 12, the material of a second shading coating layer 14b facing the light-sensing device 12 can be selected to have smaller transmittance for wide wavelengths. In addition, although the shading coating layer 14 are all disposed on the inner surface 13b of the housing 13 according to the previous embodiments, a third shading patterned layer 14c can be formed in a region on the outer surface 13c of the housing 13 opposite to the substrate 11 according to the present embodiment for reinforcing the shading effect in this region.

In addition, according to the present embodiment, the light-sensing device 12 can still be sealed in a transparent plastic material 16. More specifically, the transparent plastic material 16 is a transparent packaging material. A liquid transparent glue material (for example, resin) is first injected into the mold contacting the substrate 11. After solidification, the mold is removed. Then the light-sensing device 12 is enveloped in the transparent plastic material 16 individually and thus partially reinforcing the protection for the light-sensing device 12. Nonetheless, in practice, while executing the packaging method for the optical sensor module according to the present application, the finished housing 13 is still connected and fixed to the substrate 11 after forming the transparent plastic material 16. This is still no cutting process on the transparent plastic material 16. Moreover, according to the present embodiment, since the transparent plastic material 16 is disposed additionally, the transparent plastic material 16 can also include an optical structure 161, which can also include a lens structure, a filter structure, a diffusing structure, or an optical microstructure for facilitating the housing 13 to achieve the desired optical effects.

To sum up, the optical sensor module and the packaging method thereof according to the present application use a transparent material to manufacture the housing. Then the shading coating layer is disposed on the housing. Thereby, no hole is required on the housing for light passage. While protecting the optical elements including the light-sensing device and the light-emitting device, the performance of the optical sensor module can still be maintained by avoiding interference from noise light. According to the optical sensor module and the packaging method thereof according to the present application, no complicated cutting process on the transparent plastic material is required. Thereby, the production yield can be increased; the effective area for disposing circuit structures is further extended; and the packaging design can be miniaturized. In addition, the optical sensor module further improves the design freedom for optical structures significantly while reducing the manufacturing difficulty. Meanwhile, compared to the prior art, no extra component, module, and process is required to assemble the optical structures.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. An optical sensor module, comprising:
a substrate, including a light-sensing device and a light-emitting device; and
a housing, made of a transparent material, connected to said substrate and covering said light-sensing device;
wherein said housing includes a light-receiving region facing said light-sensing device; and said housing includes a shading coating layer on the inner surface of said housing facing said substrate and outside said light-receiving region;
wherein said housing includes a light-emitting region facing said light-emitting device; and said shading coating layer is disposed on the said inner surface of said housing facing said substrate and outside said light-receiving region and said light-emitting region;
wherein said housing includes a rib part protruding toward said substrate; said rib part is located between said light-sensing device and said light-emitting device, and said shading coating layer is disposed on a surface of said rib part facing said light-sensing device or a surface of said rib part facing light-emitting device.

2. The optical sensor module of claim 1, wherein an compartment is formed between said substrate and the inner surface of said housing; and said light-sensing device is located in said compartment.

3. The optical sensor module of claim 1, wherein the transmittance of said shading coating layer is less than 20%.

4. The optical sensor module of claim 1, wherein said light-sensing device and said light-emitting device are spaced on said substrate along a horizontal direction; said housing is located on said substrate along a vertical direction; said vertical direction is perpendicular to said horizontal direction; and said rib part is located between said light-sensing device and said light-emitting device along said horizontal direction.

5. The optical sensor module of claim 1, wherein an compartment is formed between said substrate and the inner surface of said housing; said compartment is divided by said rib part into a first compartment and a second compartment; said light-sensing device is located in said first compartment; and said light-emitting device is located in said second compartment.

6. The optical sensor module of claim 5, wherein said said shading coating layer on the surface of said rib part facing said first compartment.

7. The optical sensor module of claim 5, wherein said said shading coating layer on the surface of said rib part facing said second compartment.

8. The optical sensor module of claim 1, wherein the light emitted from said light-emitting device falls in a wavelength range; and the transmittance of said shading coating layer for the light in said wavelength range is less than 20%.

9. The optical sensor module of claim 1, wherein said shading coating layer includes multiple shading materials.

10. The optical sensor module of claim 1, wherein said housing includes an optical structure; and said optical structure includes a lens structure, a filtering structure, a diffusing structure, or an optical microstructure.

11. The optical sensor module of claim 10, wherein said optical structure includes a lens structure; and said lens structure includes one or multiple lenses.

12. The optical sensor module of claim 11, wherein said lens structure and said housing are formed integrally.

13. The optical sensor module of claim 11, wherein said lens structure is assembled to said housing.

14. The optical sensor module of claim 1, wherein said light-sensing device is surrounded a transparent plastic material.

15. The optical sensor module of claim 14, wherein said transparent plastic material includes an optical structure; and said optical structure includes a lens structure, a filtering structure, a diffusing structure, or an optical microstructure.

16. The optical sensor module of claim 1, wherein another shading coating layer can be disposed in a region on the outer surface of said housing opposite to said substrate.

17. The optical sensor module of claim 1, wherein said optical sensor module is an ambient light sensor or an image sensor.

18. The optical sensor module of claim 1, wherein said optical sensor module is a proximity sensor or an image sensor.

19. A packaging method for optical sensor module, applied for packaging one of said optical sensor module of claim 1, comprising:
　　disposing said light-sensing device and said light-emitting device on said substrate;
　　disposing said shading coating layer on the surface of said housing made of a transparent material; and
　　connecting and fixing said housing to said substrate.

* * * * *